(12) United States Patent
Yoo et al.

(10) Patent No.: US 10,641,559 B2
(45) Date of Patent: May 5, 2020

(54) HEAT EXCHANGER

(71) Applicant: Hanon Systems, Daejeon (KR)

(72) Inventors: Seok Jong Yoo, Daejeon (KR); Kwang Hun Oh, Daejeon (KR); Yang Woo Lee, Daejeon (KR); Gwnag Ok Ko, Daejeon (KR); Byung-Joo Kim, Daejeon (KR); Sun An Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/708,280

(22) Filed: Sep. 19, 2017

(65) Prior Publication Data

US 2018/0195431 A1 Jul. 12, 2018

(30) Foreign Application Priority Data

Sep. 30, 2016 (KR) .......................... 10-2016-0126289
Oct. 14, 2016 (KR) .......................... 10-2016-0133317

(51) Int. Cl.
F28F 9/00 (2006.01)
F02B 29/04 (2006.01)
(Continued)

(52) U.S. Cl.
CPC .......... *F28F 9/001* (2013.01); *F02B 29/0462* (2013.01); *F28D 7/1684* (2013.01); *F28D 9/0056* (2013.01); *F28F 3/046* (2013.01); *F28F 3/048* (2013.01); *F28F 9/002* (2013.01); *F28F 9/0263* (2013.01); *F28D 9/00* (2013.01);
(Continued)

(58) Field of Classification Search
CPC ........ F28F 9/001; F28F 9/005; F28F 2230/00; B60H 2001/00635
See application file for complete search history.

(56) References Cited

U.S. PATENT DOCUMENTS 6,099,612 A * 8/2000 Bartos ................ B01D 46/0005
  55/481
2009/0277606 A1* 11/2009 Reiss, III .............. F28D 7/1692
  165/69
2015/0159961 A1* 6/2015 Berndt ............... B60H 1/00521
  165/173

FOREIGN PATENT DOCUMENTS

DE 4313506 * 10/1994
EP 0622600 A1 11/1994
(Continued)

OTHER PUBLICATIONS

Iwasaki, JP2010127143MT, Nov. 2008.*
Sonntag, DE4313506MT, Oct. 1994.*

*Primary Examiner* — Eric S Ruppert
(74) *Attorney, Agent, or Firm* — Norton Rose Fulbright US LLP; James R. Crawford

(57) ABSTRACT

Provided is a heat exchanger. The heat exchanger includes: a core portion configured to have a cooling water channel provided therein; a housing configured to have a concave shape to have the core portion inserted thereinto so that the core portion is housed therein and have one side provided with an air inlet into which air is introduced and the other side provided with an air outlet through which the air is discharged; and a sealing member configured to be interposed between an outer side of the core portion and an inner side of the housing to seal between the core portion and the housing, thereby preventing air from being bypassed between the core portion and the housing to improve heat exchange efficiency and heat exchange performance.

6 Claims, 15 Drawing Sheets

(51) Int. Cl.
*F28F 3/04* (2006.01)
*F28F 9/02* (2006.01)
*F28D 9/00* (2006.01)
*F28D 7/16* (2006.01)
F28D 21/00 (2006.01)
F28F 9/007 (2006.01)
F28F 9/013 (2006.01)

(52) U.S. Cl.
CPC .............. *F28D 2021/0082* (2013.01); *F28D 2021/0087* (2013.01); *F28F 9/005* (2013.01); *F28F 9/0075* (2013.01); *F28F 9/013* (2013.01); *F28F 2230/00* (2013.01); *Y02T 10/146* (2013.01)

(56) References Cited

FOREIGN PATENT DOCUMENTS

| | | |
|---|---|---|
| JP | S5730597 A | 2/1982 |
| JP | 201027143 | * 11/2008 |
| JP | 2012145237 A | 8/2012 |
| JP | 2013011175 A | 1/2013 |
| JP | 2013092181 A | 5/2013 |
| KR | 101116844 B1 | 3/2012 |

* cited by examiner

HEAT EXCHANGER

CROSS-REFERENCE TO RELATED APPLICATIONS

This application claims priority under 35 U.S.C. § 119 to Korean Patent Application No. 10-2016-0126289, filed on Sep. 30, 2016 and Korean Patent Application No. 10-2016-0133317 filed on Oct. 14, 2016, in the Korean Intellectual Property Office, the disclosure of which is incorporated herein by reference in its entirety;

TECHNICAL FIELD

The following disclosure relates to a heat exchanger, and more particularly, to a heat exchanger capable of cooling air compressed to a high temperature and a high pressure by a supercharger in a water-cooled type to increase an output of an engine.

BACKGROUND

In a heat exchanger, an intercooler is an apparatus for cooling compressed air at a high temperature and a high pressure by a supercharger to increase an output of an engine.

The air rapidly compressed by the supercharger becomes extremely high in temperature and thus a volume of the compressed air is expanded and an oxygen density reduces, resulting in a reduction in charging efficiency in the cylinder. Therefore, the intercooler cools the high-temperature air compressed by the supercharger to increase suction efficiency of the engine cylinder and increase combustion efficiency, thereby increasing fuel efficiency.

The intercooler in charge of the role may be divided into water-cooled type and air-cooled type according to a cooling method. Among those, a principle of a water-cooled intercooler 10 is similar to that of an air-cooled intercooler, but the water-cooled intercooler 10 differs from the air-cooled intercooler in that it cools the compressed air using cooling water of a vehicle, water or the like instead of using external air when cooling the intercooler through which the high-temperature air passes.

The water-cooled intercooler 10 illustrated in FIG. 1 includes a first header tank 20 and a second header tank 30 disposed in parallel while being spaced apart from each other by a predetermined distance; a first inlet pipe 40 formed in the first header tank 20 and having air introduced therethrough and a first outlet pipe 50 formed in a second header tank 30 and having the air discharged therethrough; a plurality of tubes 60 having both ends fixed to the first header tank 20 and the second header tank 30 to form air passages; fins 70 interposed between the tubes 60; a cover member 80 having an assembly of the tubes 60 and the fins 70 housed therein and opened on one side surface and the other side surface where one end part of the tube 60 is located; and a second inlet pipe 41 formed on one side surface of the cover member 80 and having cooling water introduced therethrough and a second outlet pipe 51 formed on one side of the cover member 80 and having the cooling water discharged therethrough.

On the contrary, the water-cooled intercooler 10 may be configured to pass cooling water through an inside of a tube and include a case having a heat exchanger core disposed therein and surrounding the core, with the heat exchanger core being an assembly in which a header tank, a tube, and a fin are assembled, and be cooled by the core while air passing through an inner side of the case.

However, such a water-cooled intercooler can prevent air from passing between the inner side of the case and an outer side of the core to pass all the air through the core, thereby improving the heat exchange efficiency. However, since the outer side of the case and the outer side of the core are spaced apart from each other in order to insert and assemble the core into the inner side of the case, the air may be bypassed through the space between the case and the core to lower the heat exchange performance. Alternatively, in order that the inner side of the case and the outer side of the core are in close contact with each other without being spaced apart from each other, the case should be formed into several pieces and then assembled. As a result, the structure and assembly may be complicated and the structural strength of the case may be reduced.

RELATED ART DOCUMENT

Patent Document

KR 10-1116844 B1 (Feb. 8, 2012)

SUMMARY

An embodiment of the present invention is directed to providing a heat exchanger having a sealing member for preventing air from being bypassed through a space between a heat exchanger core portion and a housing to improve heat exchange efficiency.

In one general aspect, a heat exchanger includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing member 800 configured to be interposed between an outer side of the core portion 100 and an inner side of the housing 700 to seal between the core portion 100 and the housing 700, in which both longitudinal inner side surfaces and a bottom surface of the housing 700 may be concavely provided with a joining groove 730 to insert one side of the sealing member 800 into the joining groove 730 and both longitudinal outer side surfaces and a bottom surface of the core portion 100 may be concavely provided with a fitting groove 150 to insert the other side of the sealing member 800 into the fitting groove 150.

The inner side of the housing 700 and the outer side of the core portion 100 may be spaced apart from each other.

A longitudinal side surface 801 of the other end of the sealing member 800 may be formed to have a narrower width than the remaining portions.

The housing 700 may be concavely provided with a fixed groove 740 so that the fixed groove 740 is connected to the joining groove 740, and one side of the sealing member 800 inserted into the joining groove 730 of the housing 700 may be protrudedly provided with a fixed protrusion 810 to insert the fixed protrusion 810 into the fixed groove 740.

The other side of the sealing member 800 may be disposed to be spaced apart from the fitting groove 150 of the core portion 100.

The sealing member 800 may be made of an elastic material.

The other side of the sealing member 800 inserted into the fitting groove 150 of the core portion 100 may be bent by an air pressure, such that the lateral side surface 802 of the sealing member 800 adheres to the lateral side surface 152 of the fitting groove 150.

In another general aspect, a heat exchanger includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing portion configured to seal between the core portion 100 and the housing 700, in which the sealing portion may be a sealing member 800 that is formed to protrude from an inner side surface and a bottom surface of the housing 700.

The sealing member 800 may be made of a material different from that of the housing 700, and the sealing member 800 may be formed to be integrally formed with the housing 700 by the injection molding.

The sealing member 800 formed on the inner side surface of the housing 700 may be formed on at least one of the longitudinal side surface and the lateral side surface of the housing 700.

The sealing member 800 formed on the inner side surface of the housing 700 and the sealing member 800 formed on the bottom surface of the housing 700 may be connected to each other.

In another general aspect, a heat exchanger includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing portion configured to seal between the core portion 100 and the housing 700, in which the sealing portion may include an insertion groove 760 concavely formed on the inner side surface and the bottom surface of the housing 700 and a protruding portion 170 protruding from the outer side surface and the lower surface of the core portion 100 to be inserted into the insertion groove 760.

Other features and aspects will be apparent from the following detailed description, the drawings, and the claims.

| [Detailed Description of Main Elements] | |
|---|---|
| 1000: Heat exchanger | |
| 100: Core portion | |
| 111: Inlet pipe | 121: Outlet pipe |
| 130: Tube | 140: Fin |
| 150: Fitting groove | 151: Longitudinal side surface |
| 152: Lateral side surface | 160: Support portion |
| 170: Protruding portion | |
| 200: Side reinforcing plate | |
| 400: Lower reinforcing plate | |
| 500: Upper reinforcing plate | 510: Joining hole |
| 700: Housing | |
| 710: Air inlet | 720: Air outlet |
| 730: Joining groove | 740: Fixed groove |
| 750: Seating groove | 760: Insertion groove |
| 800: Sealing member | |
| 800a: Horizontal portion | 800b: Vertical portion |
| 801: Longitudinal side surface | 802: Lateral side surface |
| 810: Fixed protrusion | |

DETAILED DESCRIPTION OF EMBODIMENTS

Hereinafter, a heat exchanger according to an exemplary embodiment of the present invention having a configuration as described above will be described in detail with reference to the accompanying drawings.

First Exemplary Embodiment

Figure 1:
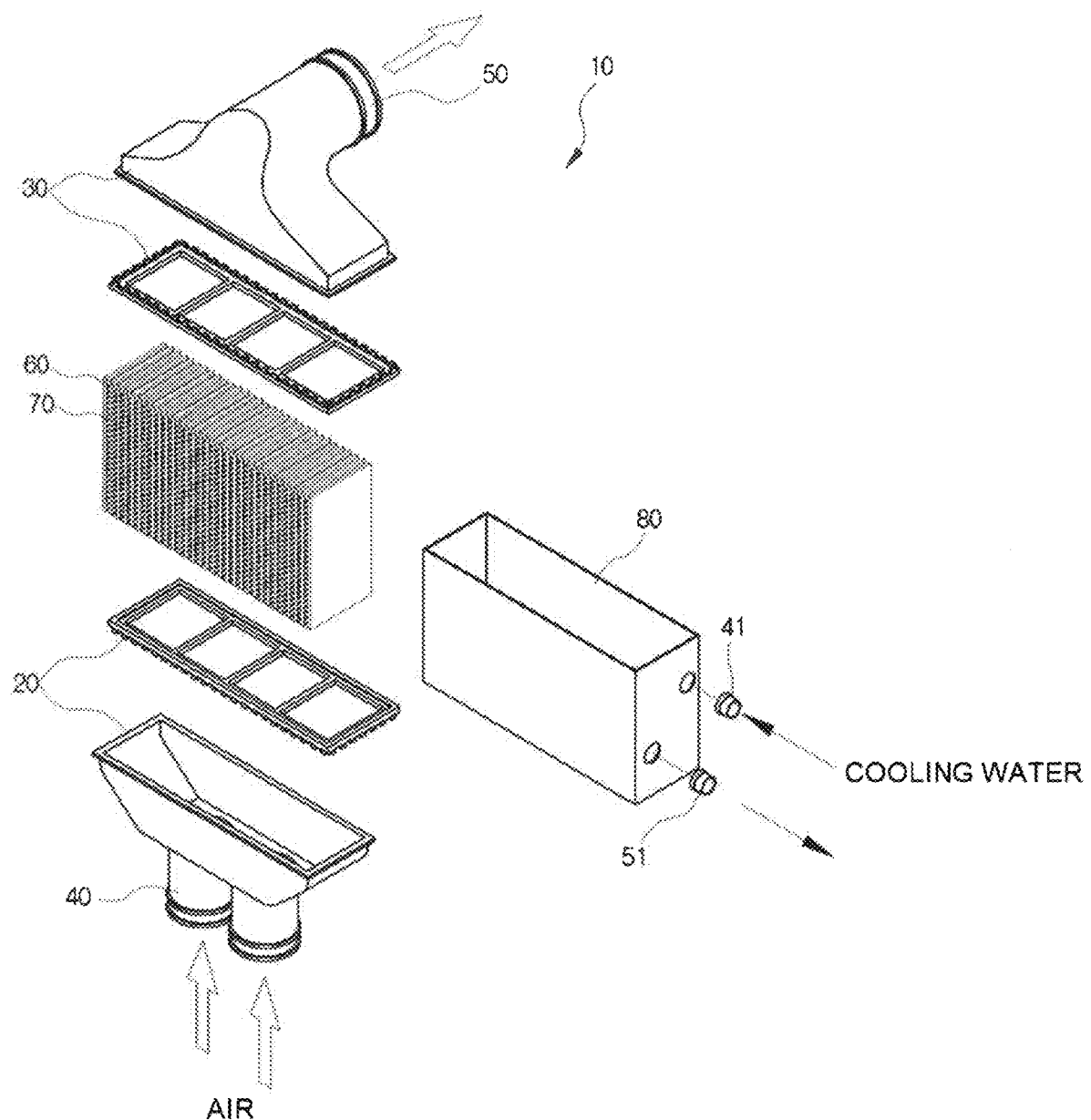
FIG. 1 is an exploded perspective view illustrating the conventional water-cooled intercooler.
Figure 2:
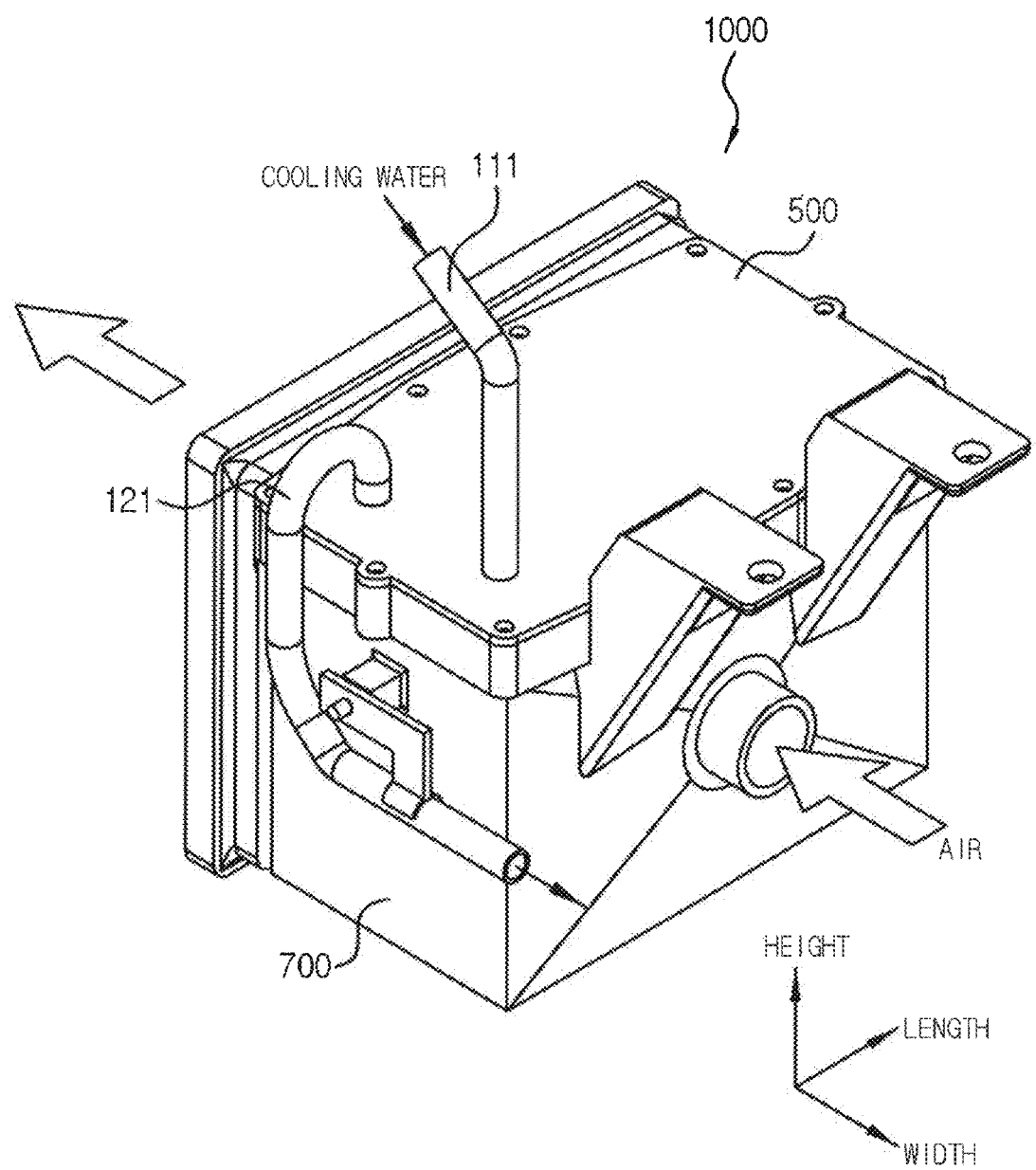
FIGS. 2 and 3 are an assembled perspective view and an exploded perspective view illustrating a heat exchanger according to a first exemplary embodiment of the present invention.
Figure 3:
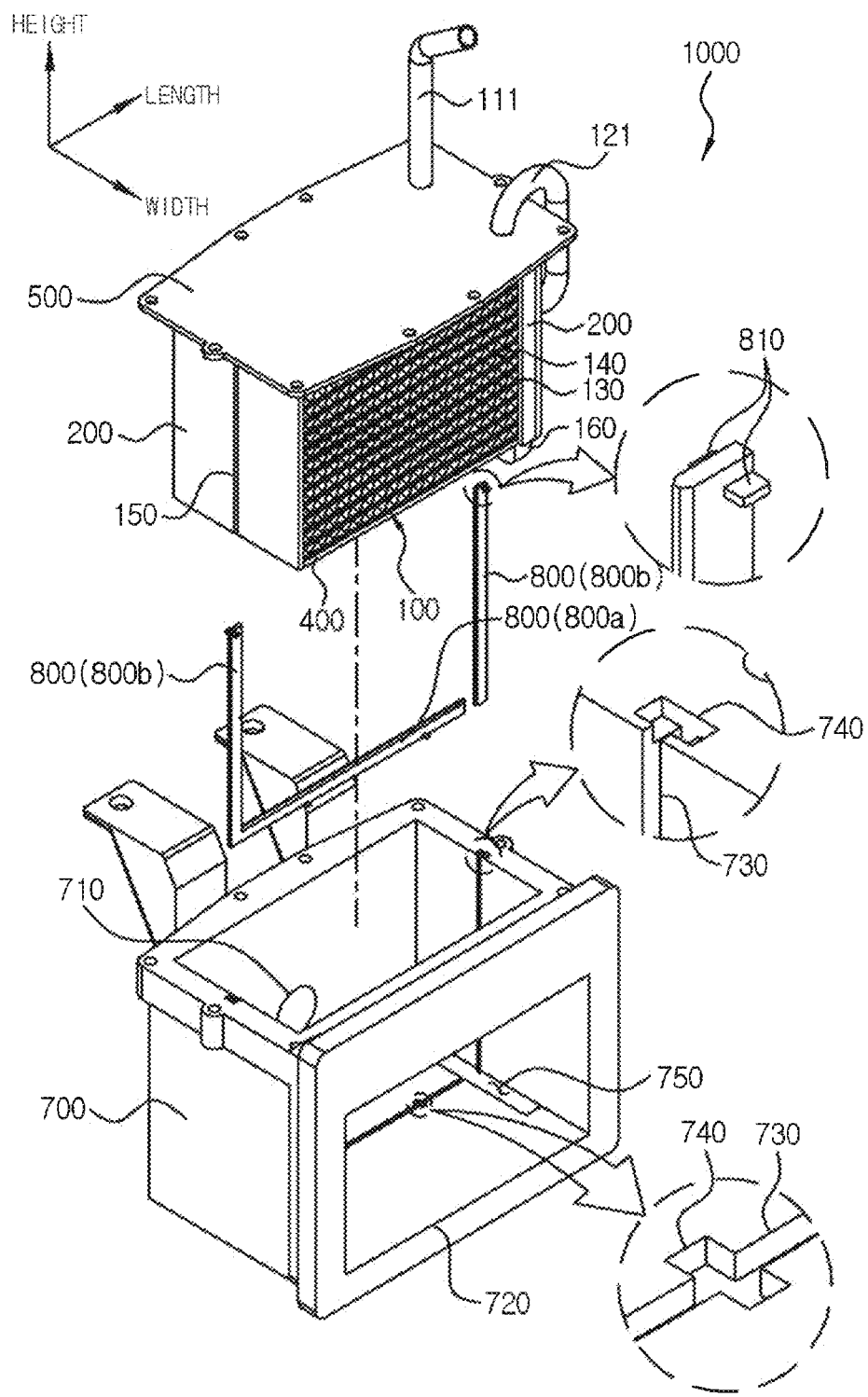
Figure 4:
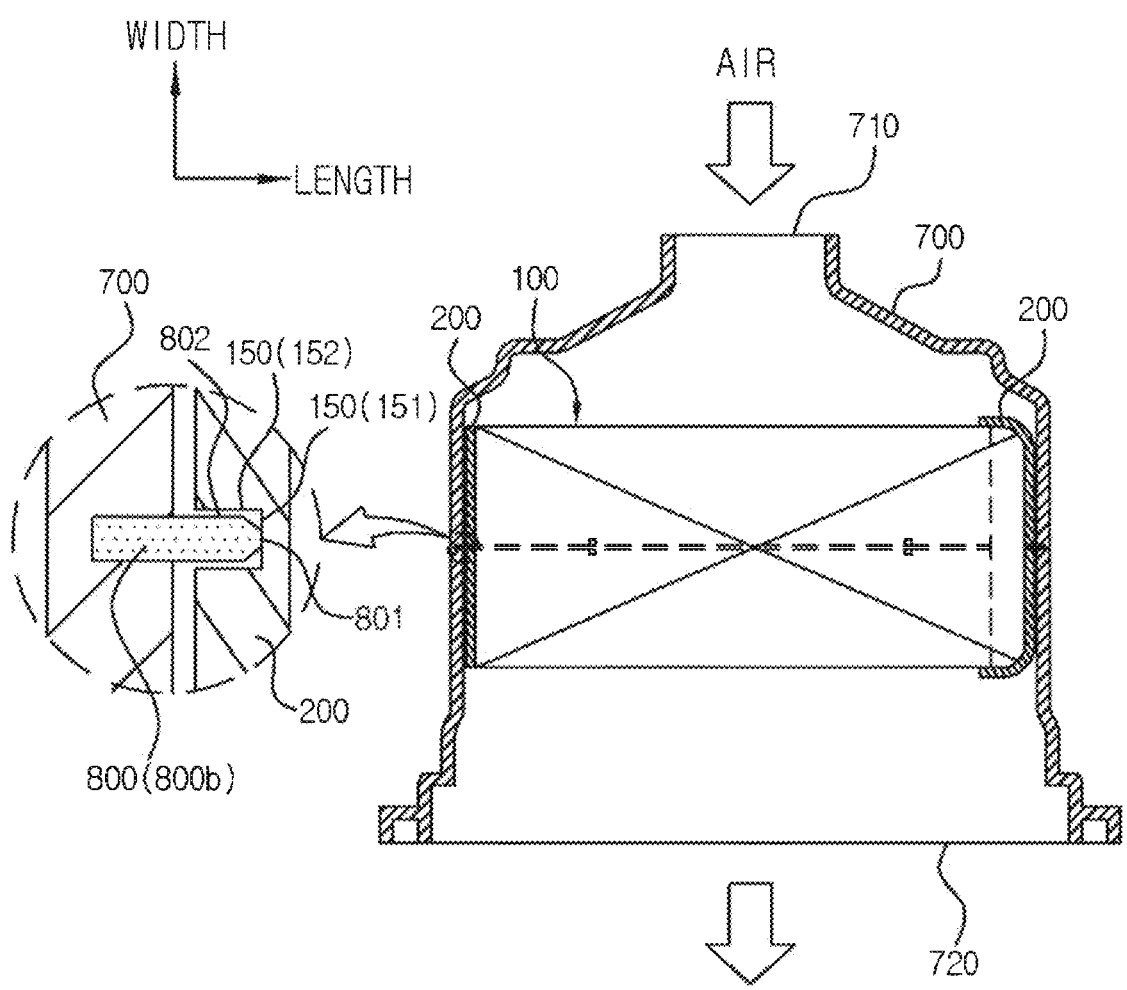
FIG. 4 is a top plan cross-sectional view of the heat exchanger according to the first exemplary embodiment of the present invention.
Figure 5:
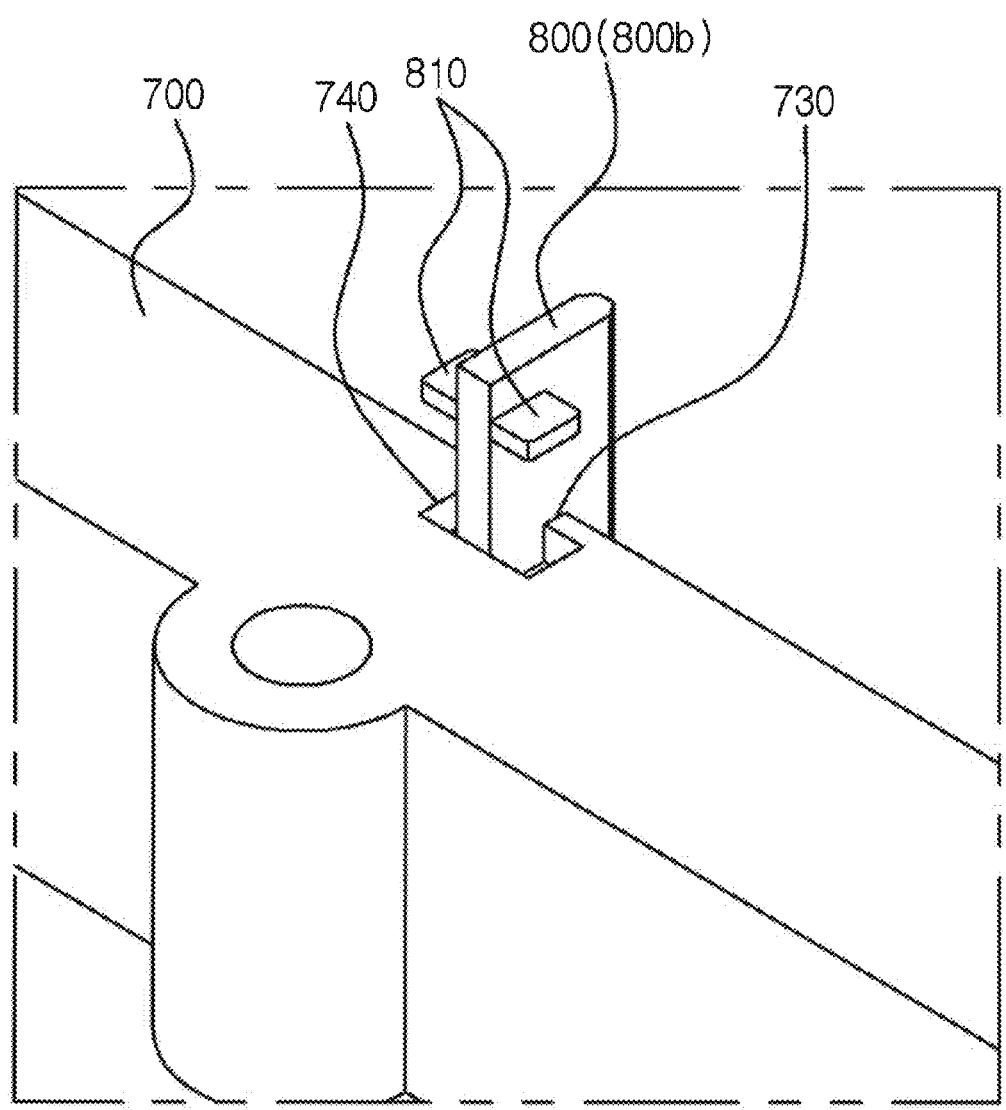
FIGS. 5 and 6 are partial perspective views illustrating a structure in which the sealing member is joined to the housing according to the first exemplary embodiment of the present invention.
Figure 6:
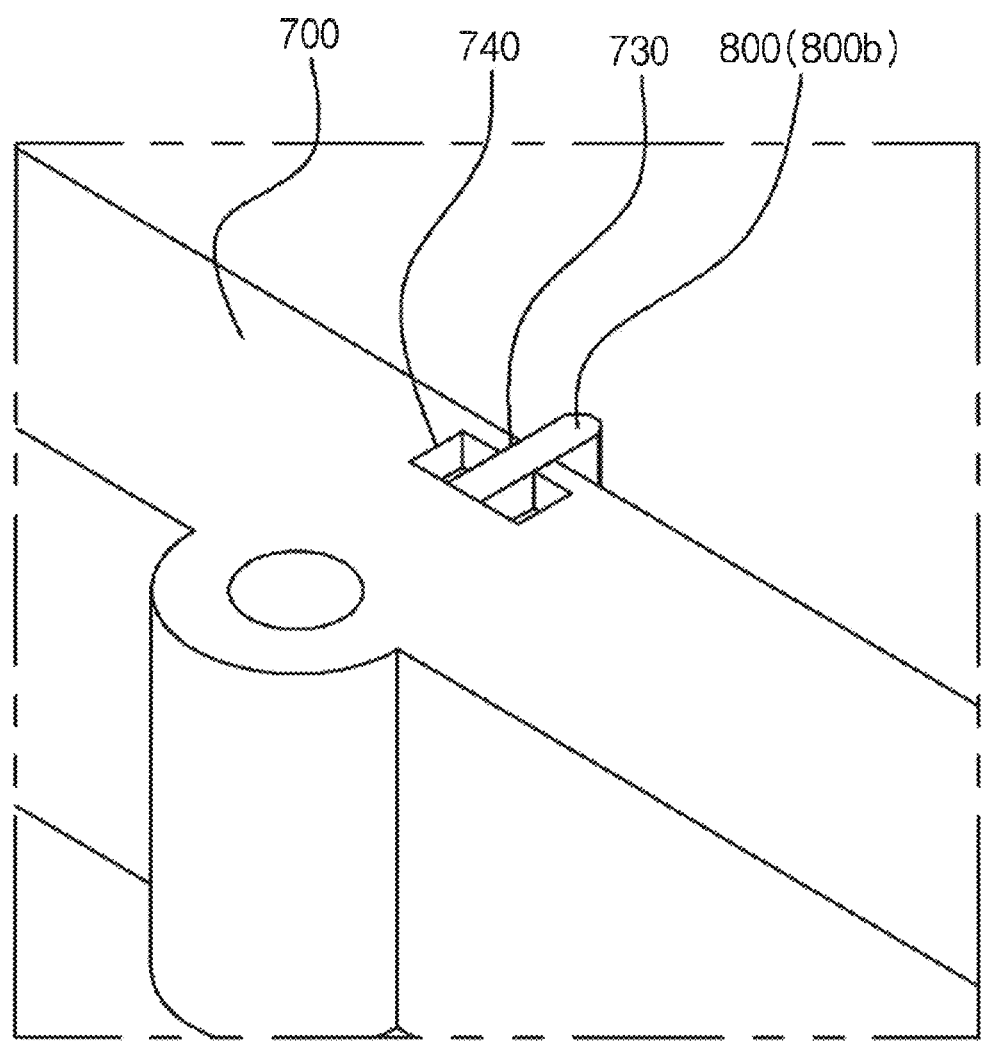

FIGS. 2 and 3 are an assembled perspective view and an exploded perspective view illustrating a heat exchanger according to a first exemplary embodiment of the present invention, FIG. 4 is a top plan cross-sectional view of the heat exchanger according to the first exemplary embodiment of the present invention, and FIGS. 5 and 6 are partial perspective views illustrating a structure in which the sealing member is joined to the housing according to the first exemplary embodiment of the present invention.

As illustrated, a heat exchanger 1000 according to a first exemplary embodiment of the present invention includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing member 800 configured to be interposed between an outer side of the core portion 100 and an inner side of the housing 700 to seal between the core portion 100 and the housing 700, in which both longitudinal inner side surfaces and a bottom surface of the housing 700 may be concavely provided with a joining groove 730 to insert one side of the sealing member 800 into the joining groove 730 and both longitudinal outer side surfaces and a bottom surface of the core portion 100 may be concavely provided with a fitting groove 150 to insert the other side of the sealing member 800 into the fitting groove 150.

First of all, the heat exchanger 1000 according to the exemplary embodiment of the present invention is configured to largely include the core portion 100, the housing 700, and the sealing member 800 which can seal between the core portion 100 and the housing 700. The core portion 100 may be configured to include the inlet tank portion, the outlet tank portion, the tube 130, and the fin 140. The inlet tank portion may be a portion forming the space in which the cooling water introduced from the outside may be stored and the cooling water may flow along an inside thereof, and may be formed in a height direction to be connected to an inlet pipe 111. The outlet tank portion is a portion forming the space in which the cooling water heat-exchanged with air passing through the core portion 100 is collected and stored and the cooling water flows along the inside thereof to be discharged to the outside, and may be formed in a height direction to be connected to an outlet pipe 121. The tubes 130 are a portion having one end connected to the inlet tank portion and the other end connected to the outlet tank portion to form a channel through which the cooling water may flow and exchange heat with air, and may be formed in parallel to each other in a longitudinal direction while being arranged to be spaced apart from each other in a height direction. At this time, the tank portions 110 and 120 and the tubes 130 may have various shapes. For example, the tank portions 110 and 120 and the tubes 130 may be formed in a plate type heat exchanger form in which a plurality of plates are stacked to be integrally formed and may also be formed in a extrusion tube type heat exchanger form in which a plurality of tubular tubes 130 are connected to tubular tanks or header tanks to be fixed thereto. The fins 140 may be interposed between the tubes 130 to increase heat exchange efficiency. For example, the fins 140 may be formed in a corrugated shape to be joined to the tubes 130. In addition, the tank portions are disposed on one side or both sides in a longitudinal direction, but these drawings illustrate that the tank portions are disposed on one side in the longitudinal direction, which will be described below. Further, as illustrated, the tank portions and the tubes 130 will be described with reference to the plate type heat exchanger form in which a plurality of plates are stacked to be integrally formed. At this time, the cooling water introduced into the inlet tank portion may flow in a U-turned form along the tube 130 to be discharged to the outside through the outlet tank portion. Thus, the cooling water introduced from the outside may be distributed to the tubes 130 while flowing in the height direction along the inlet tank portion and may flow in the longitudinal direction along the tubes 130 to be U-turned and may be collected in the outlet tank portion to flow in the height direction and discharged to the outside. At this time, air may flow from a front side to a rear side of the core portion 100 in a width direction, and air may be cooled by exchanging heat while passing between the tubes 130.

In addition, a side reinforcing plate 200 may be joined to both longitudinal side surfaces of the core portion 100 to reinforce the strength of the core portion 100, a lower reinforcing plate 400 may be joined to a lower surface of the core portion 100, and an upper reinforcing plate 500 may be joined to an upper surface of the core portion 100 to reinforce the strength of the core portion 100. Further, the lower sides of the side reinforcing plates 200 may be joined to the lower reinforcing plate 400 and the upper sides thereof may be joined to the upper reinforcing plate 500. At this time, the parts configuring the core portion 100 and the reinforcing plates may be assembled and then joined by brazing, welding or the like.

The housing 700 may be concavely formed so that the inside thereof is hollow and the top side thereof is open, and the core portion 100 may be inserted into the housing 700 to be housed therein. At this time, the upper reinforcing plate 500 joined to the upper side of the core portion 100 is formed wider than the upper surface of the core portion 100, and the core portion 100 is inserted into and assembled in the housing 700 formed so that a circumferential part of the upper reinforcing plate 500 may be provided with through holes vertically penetrating therethrough to pass air, and then the upper reinforcing plate 500 may be joined to the housing 700 by using fastening means.

The sealing member 800 may be interposed between an outer side of the core portion 100 and an inner side of the housing 700 to seal between the core portion 100 and the housing 700.

Here, both longitudinal inner side surfaces and the bottom surface of the housing 700 may be formed with the concave joining groove 730, such that one side of the sealing member 800 can be inserted into the joining groove 730 to be joined thereto. Therefore, the other side of the sealing member 800 may be disposed to protrude from the inner side surface of the housing 700 in a state where one side of the sealing member 800 is inserted into the joining groove 730 of the housing 700. Both longitudinal outer side surfaces and the bottom surface of the core portion 100 may be concavely provided with the fitting groove 150, such that the other side of the sealing member 800 may be disposed to be inserted into the fitting groove 150. At this time, the drawings illustrate that the fitting groove 150 formed in the core portion 100 is formed on the side reinforcing plates 200 and the lower reinforcing plate 400 that are joined to the core portion 100, but the core portion 100 itself may be provided with the fitting groove without the side reinforcing plate 200 and the lower reinforcing plate 400.

The sealing member 800 may include a horizontal portion 800a disposed on the lower side of the housing 700 in the height direction and a vertical portion 800b disposed on both sides of the housing 700 in the longitudinal direction. As illustrated, the horizontal portion 800a and the vertical portion 800b may be formed to be connected to each other or may be formed separately. In addition, one side of the sealing member 800 inserted into the joining groove 730 of the housing 700 may be a lower side in the height direction on the horizontal portion 800a or an outer side in the longitudinal direction on the vertical portion 800b. On the contrary, the other side of the sealing member 800 inserted into the fitting groove 150 of the core portion 100 may be an upper side in the height direction on the horizontal portion 800a or an inner side in the longitudinal direction on the vertical portion 800b.

In the heat exchanger according to the exemplary embodiment of the present invention, air is not bypassed through the space between the core portion and the housing due to the sealing member, thereby improving the heat exchange efficiency, the sealing member can be easily joined to the housing without the separate adhesive or rib for reinforcement, and the sealing member may serve as the guide when the core portion is assembled in the housing to facilitate the assembly of the core portion.

Further, the inlet pipe 111 connected to the inlet tank portion of the core portion 100 and the outlet pipe 121 connected to the outlet tank portion thereof are further provided, such that the inlet pipe 111 and the outlet pipe 121 may be joined to each other to penetrate through the upper reinforcing plate 500. That is, the inlet pipe 111 may be connected to the inlet tank portion of the core portion 100, and the outlet pipe 121 may be connected to the outlet tank portion of the core portion 100. At this time, the inlet pipe 111 and the outlet pipe 121 may be joined to each other to penetrate through a joining hole formed to penetrate through the upper reinforcing plate 500, and the inlet pipe 111 and the outlet pipe 121 may be fixedly joined to the upper reinforcing plate 500 by brazing, welding or the like.

In addition, the fitting groove 150 formed in the core portion 100 may be formed only on both longitudinal outer side surfaces of the core portion 100. That is, when the core portion 100 is assembled in the housing 700 by being inserted thereinto downwardly from above, the sealing member 800 disposed on the bottom surface of the housing 700 may adhere to the bottom surface of the core portion 100, such that the bottom surface of the core portion 100 may not be provided with the fitting groove 150. The bottom surface of the core portion 100 is provided with a support portion 160 protruding downwardly and an outside of the support portion 160 is joined to an anti-vibration member, such that the support portion 160 joined to the anti-vibration member may be inserted into a seating groove 750 formed on the bottom surface of the housing 700. Accordingly, the sealing member 800 may have a form in which it is divided into two, instead of a form in which it has an integrated form, but may have various shapes.

In addition, the inside of the housing 700 and the outside of the core portion 100 may be spaced apart from each other.

That is, an area of the core portion 100 is formed to have a smaller area than that of an inside space of the housing 700 when viewed from above so that the core portion 100 can be easily inserted into a hollow space in the housing 700, such that the inner side surface of the housing 700 may be disposed to be spaced apart from the outer side surface of the core portion 100. Both outer side surfaces of the core portion 100 and both inner side surfaces of the housing 700 are formed to be spaced apart from each other in the longitudinal direction, such that the core portion 100 may be assembled in the housing 700 by being easily inserted into the housing 700 downwardly from above through the opened upper side of the housing 700.

In addition, a longitudinal side surface 801 of the other end of the sealing member 800 may be formed to have a narrower width than the remaining portions.

That is, when one side of the sealing member 800 is inserted into the joining groove 730 of the housing 700 and then the core portion 100 is assembled in the housing 700 by being inserted into the inside of the housing 700, the sealing member 800 can come in contact with the fitting groove 150 of the core portion 100 in the form in which the other side of the sealing member 800 is inserted into the fitting groove 150 to reduce a frictional force due to the contact, such that the core portion 100 may be assembled in the housing 700 by being easily slid even if the sealing member 100 comes into contact with the fitting groove 150 of the core portion 100. At this time, the other end of the sealing member 800 may be formed in a chamfered shape as illustrated in the drawing. In addition, the end of the sealing member 800 may be formed in various shapes such as a circular shape and a pointed shape. Accordingly, the width of the longitudinal side surface 801 of the other end is narrower than the remaining portions of the sealing member 800, thereby reducing the contact area with the longitudinal side surface 151 of the fitting groove 150.

In addition, the housing 700 is concavely provided with a fixed groove 740 so that the fixed groove 740 is connected to the joining groove 740, and one side of the sealing member 800 inserted into the joining groove 730 of the housing 700 may be protrudedly provided with a fixed protrusion 810 to insert the fixed protrusion 810 into the fixed groove 740.

That is, as illustrated in FIGS. 5 and 6, the housing 700 may be concavely provided with the fixed grooves 740 so that the fixed grooves 740 are connected to the joining grooves 730, and the portion inserted into the joining groove 730 that is one side of the sealing member 800 may be provided with the fixed protrusion 810 protruding from one side or both sides in a width direction. The fixed protrusion 810 of the sealing member 800 is inserted into the fixed groove 740, such that the sealing member 800 can be firmly fixed to the housing 700, and the movement of the sealing member may be limited to be prevented from moving in the height direction and the longitudinal direction. Therefore, when the core portion 100 is assembled in the housing 700 by being inserted thereinto, or to the contrary, is separated therefrom, it is possible to prevent the sealing member 800 from being separated or pushed from the joining groove 730 of the housing 700 even if the core portion 100 comes into contact with the sealing member 800. The fixed protrusion 810 of the sealing member 800 and the fixed groove 740 of the housing 700 may be formed in various positions and numbers. As illustrated, the fixed groove 740 may be concavely formed on the upper surface of the housing 700 and the fixed protrusion 810 of the sealing member 800 may also be formed to correspond to the position and form of the fixed groove 740, and the bottom surface of the housing 700 may also be provided with the fixed groove 740 and thus the fixed protrusion 810 of the sealing member 800 may also be formed to correspond thereto.

In addition, the other side of the sealing member 800 may be disposed to be spaced apart from the fitting groove 150 of the core portion 100.

That is, the other side of the sealing member 800 inserted into the fitting groove 150 of the core portion 100 may be disposed so that at least any one of longitudinal side surfaces 801 and a lateral side surface 802 is spaced apart from the fitting groove 150. For example, as illustrated, the other lateral side surfaces 802 of the sealing member 800 may be disposed to be spaced apart from the fitting groove 150 and the other longitudinal side surface 801 of the sealing member 800 may be disposed enough not to be compressed by the core portion 100, with being in contact with the fitting groove 150 of the core portion 100 and may also be disposed to be spaced apart from the fitting groove 150.

When the core portion 100 is assembled in the housing 700 by being inserted thereinto, with the sealing member 800 being assembled in the housing 700, the contact area between the fitting groove 150 of the core portion 100 and the sealing member 800 is reduced, thereby facilitating the assembly. By the way, at this time, if the other side of the sealing member 800 and the fitting groove 150 are separated from each other, the core portion 100 and the housing 700 cannot be completely sealed. However, since hot air flows into the housing 700 during the operation of the intercooler, the other side of the sealing member 800 can come into contact with the fitting groove 150 of the core portion 100 by thermal expansion or the like while the core portion 100 is heated, such that the core portion 100 and the housing 700 can be sealed.

In addition, the sealing member 800 may also be made of an elastic material.

That is, since the sealing member 800 is made of the elastic material, the sealing member 800 can serve to absorb vibrations while serving as sealing to prevent air from being bypassed between the core portion 100 and the housing 700. Further, the sealing member 800 of the elastic material can absorb dimensional tolerances and assembly tolerances.

In addition, the other side of the sealing member 800 inserted into the fitting groove 150 of the core portion 100 is bent by an air pressure, such that the lateral side surface 802 of the sealing member 800 may adhere to the lateral side surface 152 of the fitting groove 150.

Figure 7:
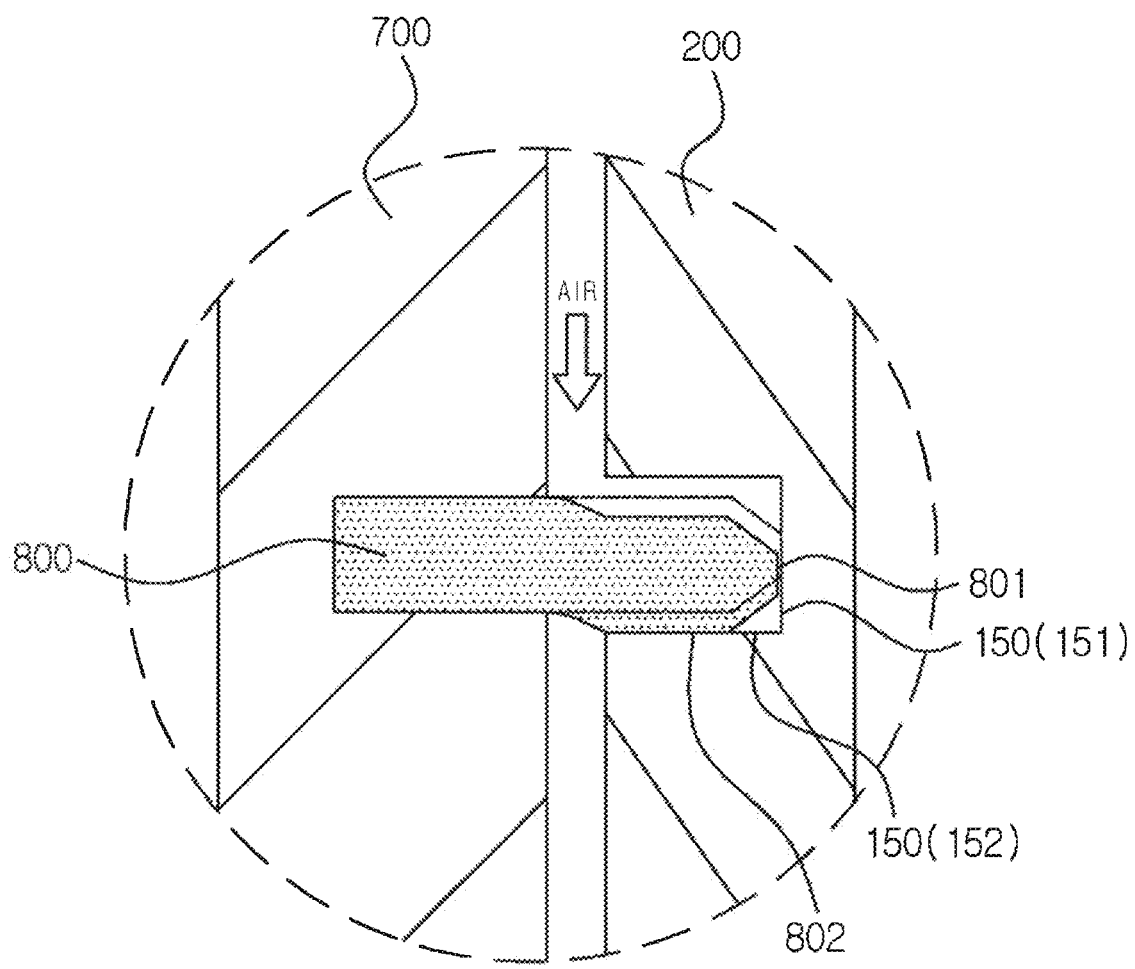
FIG. 7 is a partial cross-sectional view illustrating a structure in which the sealing member according to the first exemplary embodiment of the present invention is bent by the air pressure to adhere to the side surface of the fitting groove.

That is, as illustrated in FIG. 7, high-temperature and high-pressure air is introduced into the housing 700 through an air inlet 710 which is one side of the heat exchanger during the operation of the heat exchanger, and a pressure drop is generated as the air passes through the core portion 100 to generate a pressure difference between the air inlet 710 side and the air outlet 720. As a result, the lateral side surface 802 of the other side of the sealing member 800 may adhere to the lateral side surface 152 of the fitting groove 150 of the core portion 100 as the other side of the sealing member 800 is bent by being pushed in a flow direction of air, which is a width direction, by the air pressure, such that the space between the core portion 100 and the housing 700 can be sealed.

In addition, contrary to the above description, the sealing member 800 is first inserted into the fitting groove 150 of the core portion 100 and then the core portion 100 to which the sealing member 800 is joined may be assembled in the housing 700 by being inserted thereinto.

In addition, the groove is concavely formed on the upper surface of the housing 700 and is applied or interposed with a separate sealing member, and then the upper reinforcing plate 500 joined to the upper side of the core portion 100 adheres to the upper surface of the housing 700, such that the space between the lower surface of the upper reinforcing plate 500 and the upper surface of the housing 700 can be sealed.

Second Exemplary Embodiment

Figure 8:
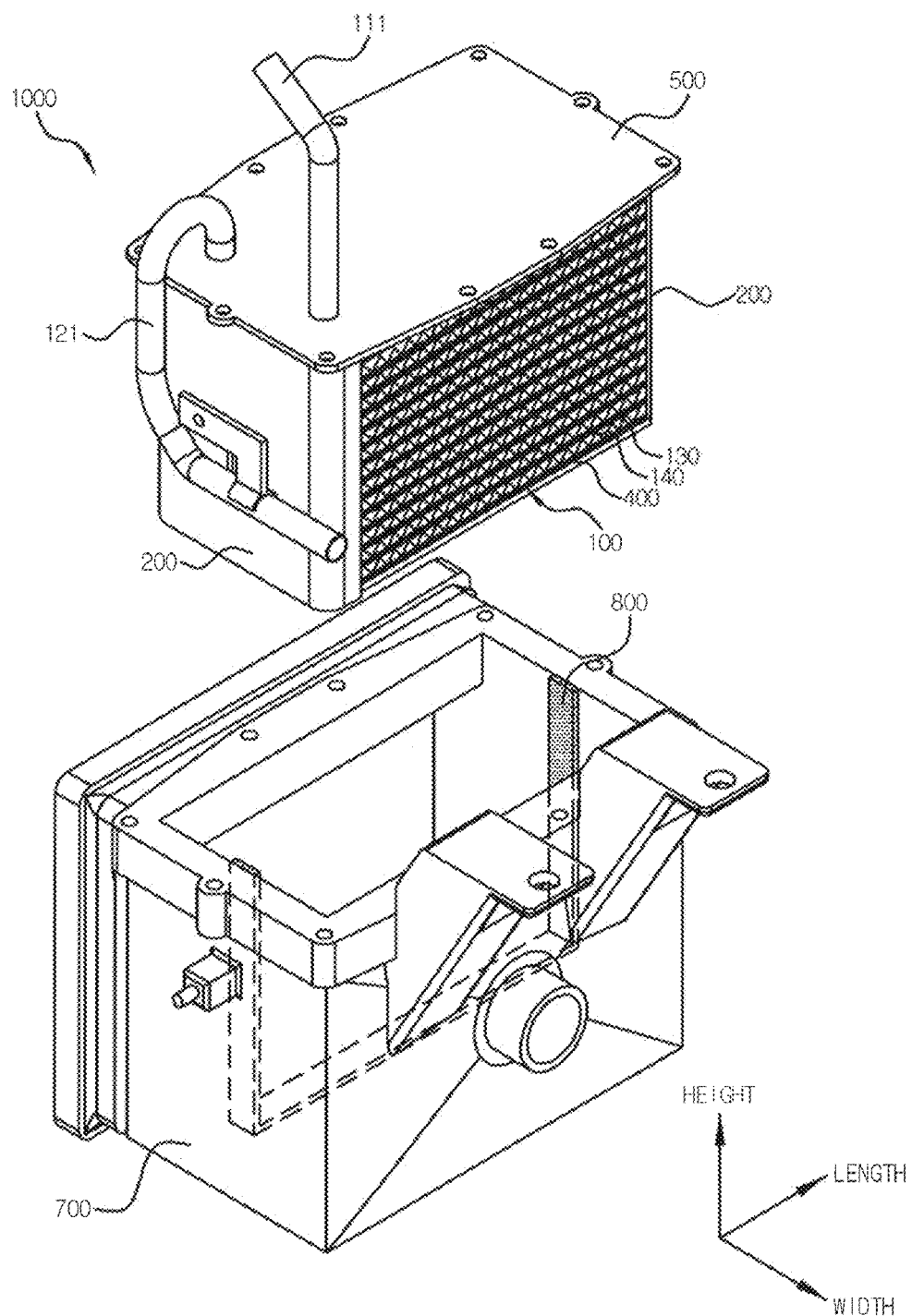
FIG. 8 is an assembled perspective view and an exploded perspective view illustrating a heat exchanger according to a second exemplary embodiment of the present invention.
Figure 9:
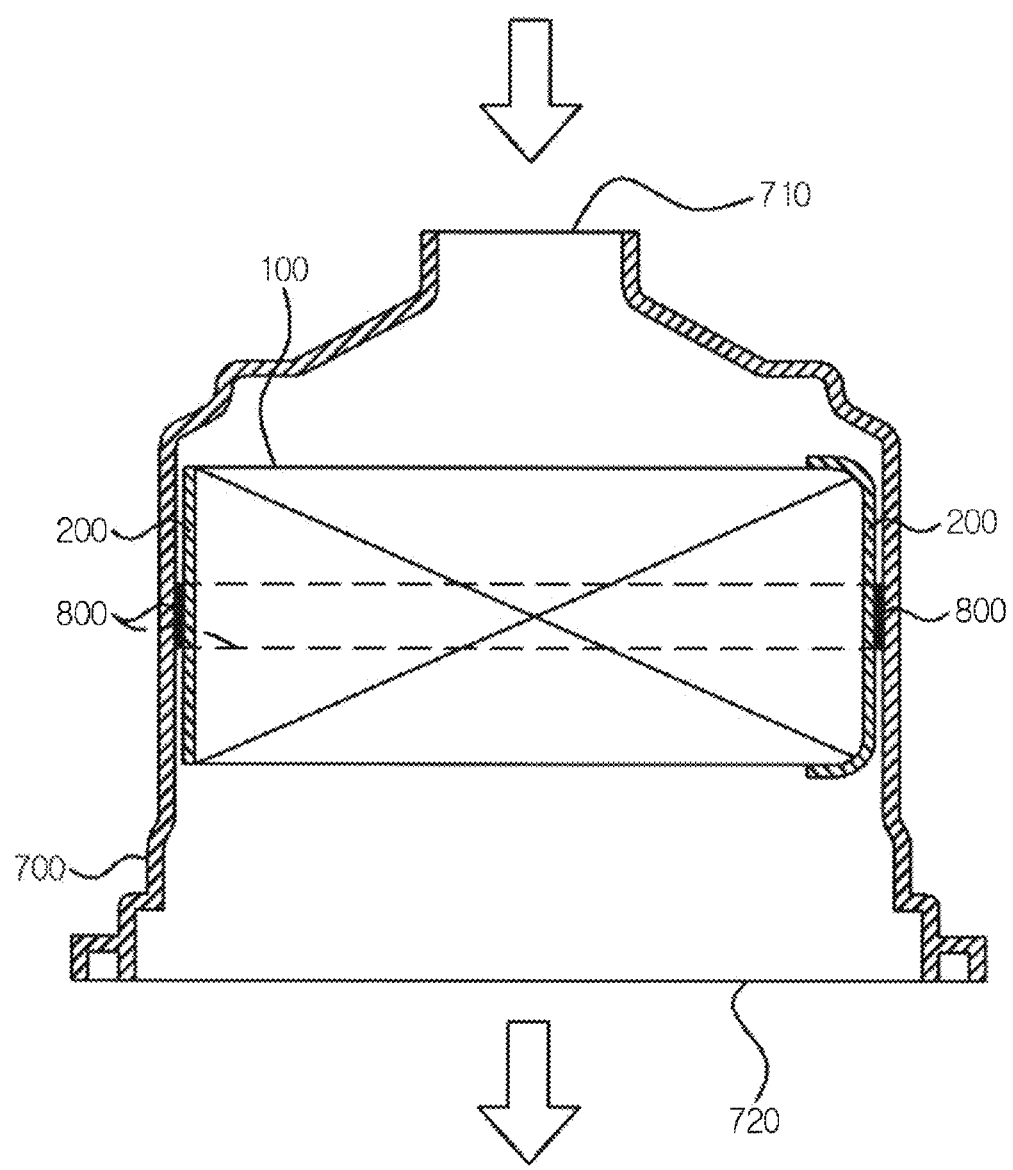
FIG. 9 is a top plan cross-sectional view schematically illustrating the heat exchanger according to the second exemplary embodiment of the present invention.
Figure 10:
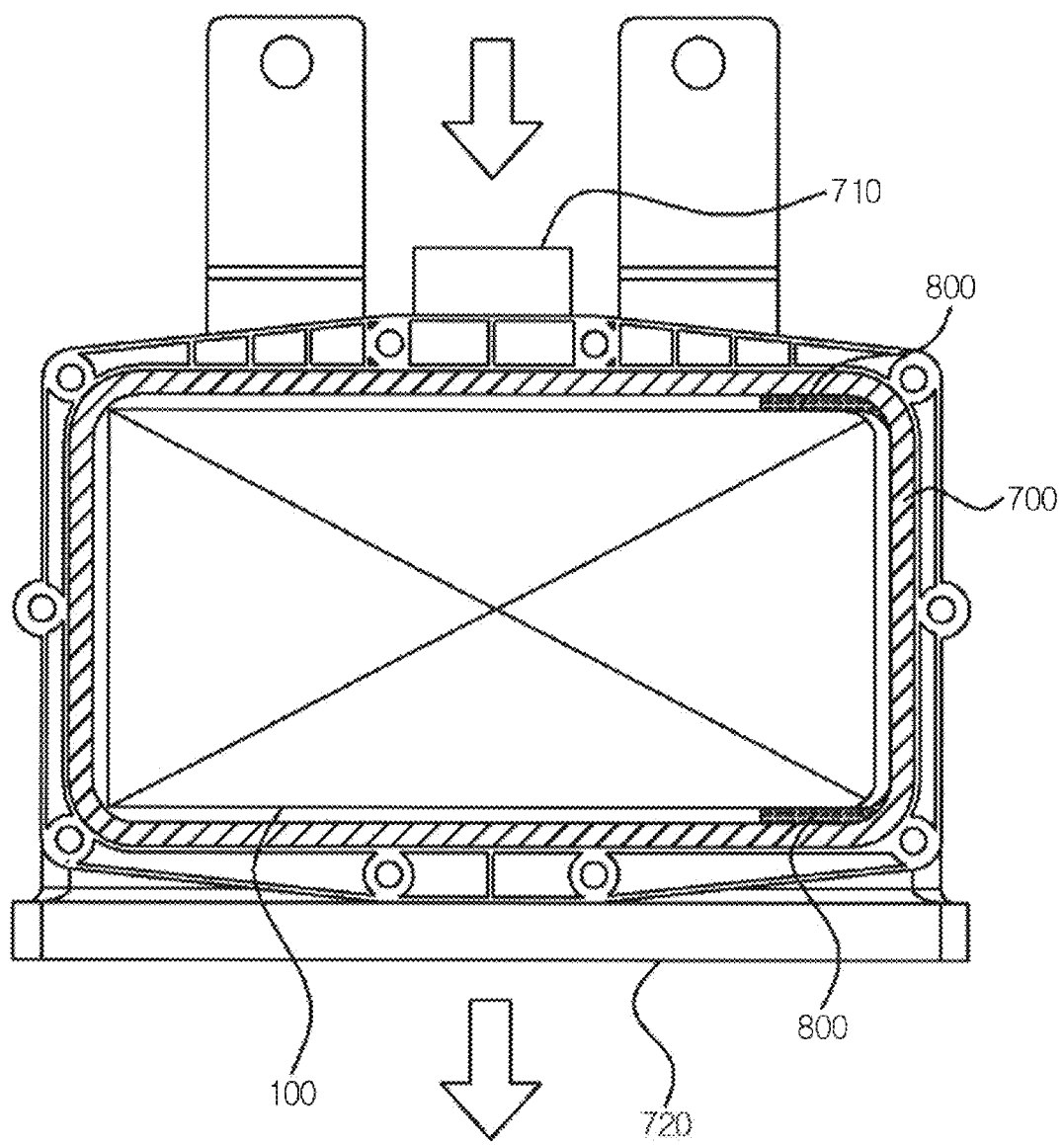
FIGS. 10 to 13 are top plan cross-sectional views schematically illustrating various forms of sealing members in the heat exchanger according to the second exemplary embodiment of the present invention.
Figure 11:
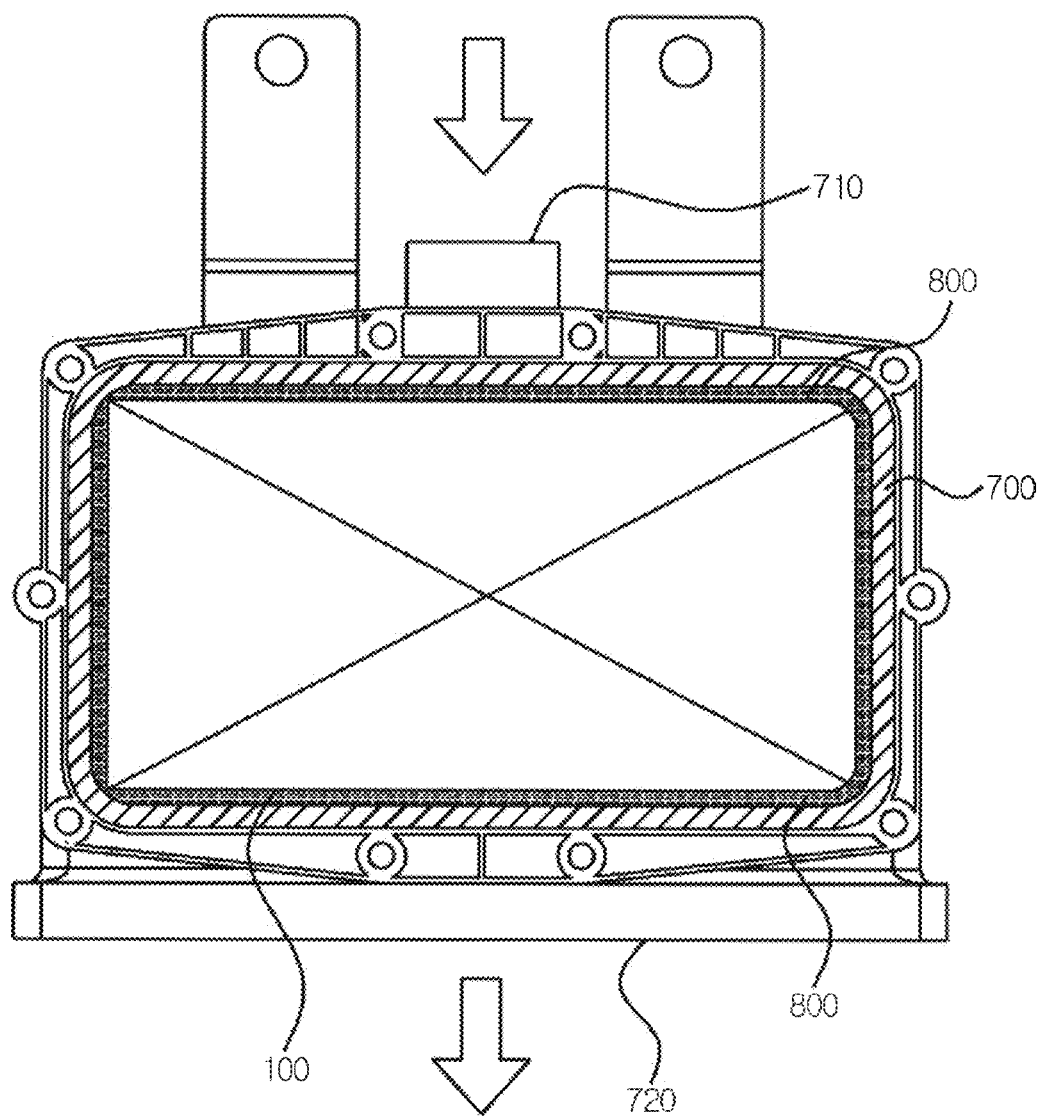
Figure 12:
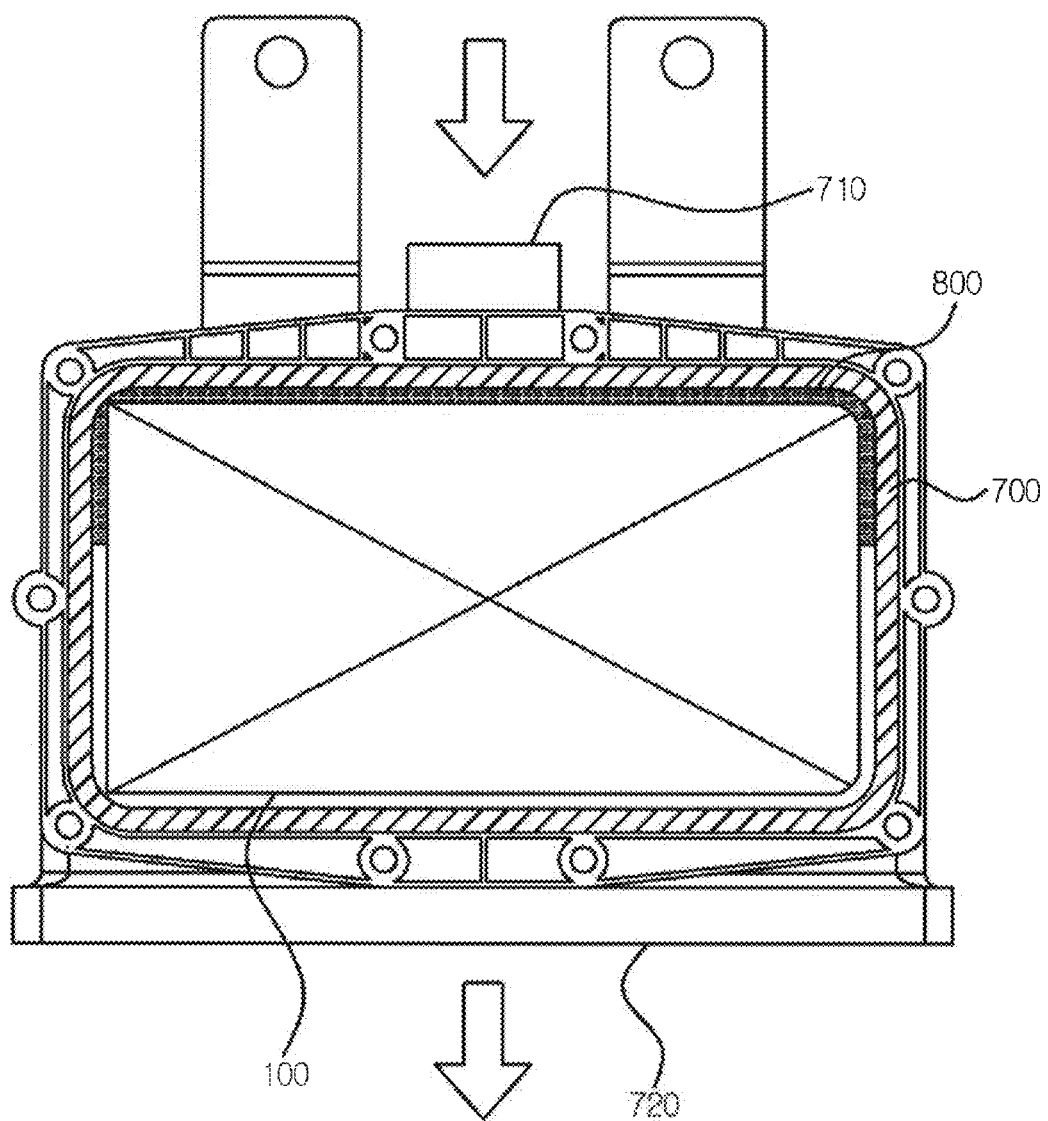
Figure 13:
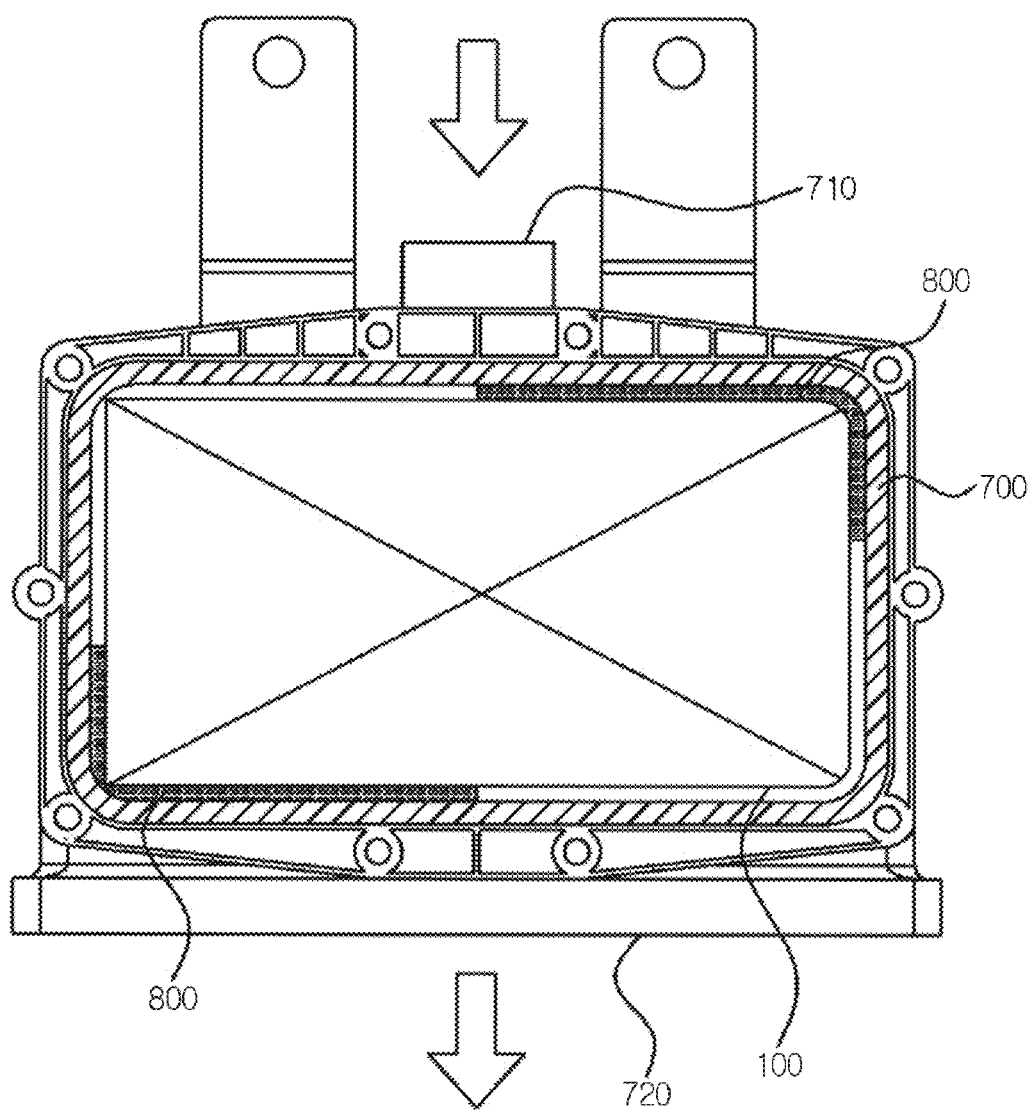

FIG. 8 is an exploded perspective view illustrating a heat exchanger according to a second exemplary embodiment of the present invention and FIG. 9 is a top plan cross-sectional view schematically illustrating the heat exchanger according to the second exemplary embodiment of the present invention.

As illustrated, a heat exchanger 1000 according to a second exemplary embodiment of the present invention includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing portion configured to seal between the core portion 100 and the housing 700, in which the sealing portion may be a sealing member 800 that is formed to protrude from an inner side surface and a bottom surface of the housing 700.

First, the heat exchanger 1000 according to the second exemplary embodiment of the present invention may be configured to largely include a core portion 100, a housing 700 and a sealing portion, in which the sealing portion may be a sealing member 800 that seals between the core portion 100 and the housing 700. The core portion 100 may be configured to include the inlet tank portion, the outlet tank portion, the tube 130, and the fin 140. The inlet tank portion may be a portion forming the space in which the cooling water introduced from the outside may be stored and the cooling water may flow along an inside thereof, and may be formed in a height direction to be connected to an inlet pipe 11. The outlet tank portion is a portion forming the space in which the cooling water heat-exchanged with air passing through the core portion 100 is collected and stored and the cooling water flows along the inside thereof to be discharged to the outside, and may be formed in a height direction to be connected to an outlet pipe 121. The tubes 130 are a portion having one end connected to the inlet tank portion and the other end connected to the outlet tank portion to form a channel through which the cooling water may flow and exchange heat with air, and may be formed in parallel to each other in a longitudinal direction while being arranged to be spaced apart from each other in a height direction. At this time, the tank portions 110 and 120 and the tubes 130 may have various shapes. For example, the tank portions 110 and 120 and the tubes 130 may be formed in a plate type heat exchanger form in which a plurality of plates are stacked to be integrally formed and may also be formed in a extrusion tube type heat exchanger form in which a plurality of tubular tubes 130 are connected to tubular tank portions or header tanks to be fixed thereto. The fins 140 may be interposed between the tubes 130 to increase heat exchange efficiency. For example, the fins 140 may be formed in a corrugated shape to be joined to the tubes 130. In addition, the tank portions are disposed on one side or both sides in a longitudinal direction, but these drawings illustrate that the tank portions are disposed on one side in the longitudinal direction, which will be described below. Further, as illustrated, the tank portions and the tubes 130 will be described with reference to the plate type heat exchanger form in which a plurality of plates are stacked to be integrally formed. At this time, the cooling water introduced into the inlet tank portion may flow in a U-turned form along the tube 130 to be discharged to the outside through the outlet tank portion. Thus, the cooling water introduced from the outside may be distributed to the tubes 130 while flowing in the height direction along the inlet tank portion and may flow in the longitudinal direction along the tubes 130 to be U-turned and may be collected in the outlet tank portion to flow in the height direction and discharged to the outside. At this time, air may flow from a front side to a rear side of the core portion 100 in a width direction, and air may be cooled by exchanging heat while passing between the tubes 130.

In addition, a side reinforcing plate 200 may be joined to both longitudinal side surfaces of the core portion 100 to reinforce the strength of the core portion 100, a lower reinforcing plate 400 may be joined to a lower surface of the core portion 100, and an upper reinforcing plate 500 may be joined to an upper surface of the core portion 100 to reinforce the strength of the core portion 100. Further, the lower sides of the side reinforcing plates 200 may be joined to the lower reinforcing plate 400 and the upper sides thereof may be joined to the upper reinforcing plate 500. At this time, the parts configuring the core portion 100 and the reinforcing plates may be assembled and then joined by brazing, welding or the like.

The housing 700 may be concavely formed so that the inside thereof is hollow and the top side thereof is open, and the core portion 100 may be inserted into the housing 700 to be housed therein. At this time, the upper reinforcing plate 500 joined to the upper side of the core portion 100 is formed wider than the upper surface of the core portion 100, and the core portion 100 is inserted into and assembled in the housing 700 formed so that a circumferential part of the upper reinforcing plate 500 may be provided with through holes vertically penetrating therethrough to pass air, and then the upper reinforcing plate 500 may be joined to the housing 700 by using fastening means.

The sealing portion may be formed to seal between the core portion 100 and the housing 700 and the sealing portion may be the sealing member 800 formed to protrude from the inner side surface and the bottom surface of the housing 700. That is, the sealing member 800 protruding from the inner side surface of the housing 700 may be disposed in the space between the core portion 100 and the housing 700 to seal the gap therebetween, thereby realizing the sealing. At this time, the sealing member 800 may be formed so as to seal between the outer side surface of the core portion 100 and the inner side surface of the housing 700. In addition, the sealing member 800 may be formed to seal the outer lower surface of the core portion 100 and the inner bottom surface of the housing 700. For example, the sealing member 800 may be formed on both inner side surfaces of the housing 700 in the longitudinal direction and may be formed even on the bottom surface thereof, such that air cannot be bypassed between the core portion 100 and the housing 700. Further, the sealing member 800 may be formed so that the surface facing the core portion 100 contacts the side surface of the core portion 100 or the smallest gap is formed. At this time, if the sealing member 800 and the core portion 100 are separated from each other, the complete sealing cannot be made, but since the hot air is introduced into the housing 700 during the operation of the intercooler, the sealing member 800 and the core portion 100 adhere to each other by thermal expansion while the core portion 100 is heated, thereby realizing the sealing.

Accordingly, the heat exchanger according to the exemplary embodiment of the present invention includes the sealing member to prevent the air from being bypassed through the space between the core portion and the housing, thereby improving the heat exchange efficiency and the heat exchange performance.

In addition, the sealing member 800 may be made of a material different from that of the housing 700. The sealing member 800 may be formed to be integrally formed with the housing 700 by the injection molding.

For example, when the housing 700 is manufactured by the injection molding using a plastic material, the sealing member 800 such as a rubber material may be formed to be injected integrally with the housing 700 by the double injection or the like. Accordingly, there is no need for a separate structure in which the sealing member 800 is joined to the housing 700 to be fixed thereto, and the sealing member 800 can be firmly joined to the housing 700 to be fixed thereto.

In addition, the sealing member 800 formed on the inner side surface of the housing 700 may be formed on at least one of the longitudinal side surface and the lateral side surface of the housing 700.

That is, referring to FIGS. 10 to 13, the sealing member 800 formed on the inner side surface of the housing 700 may variously formed in a form of the longitudinal one side surface, the both longitudinal side surfaces, the one lateral side surface, and the both lateral side surfaces among the inner side surfaces of the housing 700, and may be formed on both of the longitudinal side surfaces and the lateral side surfaces. Alternatively, the sealing member 800 may be formed on a part of the longitudinal side surface or a part of the lateral side surface and may be also formed in a form in which the longitudinal side surface and the lateral side surface are connected to each other. As illustrated, since the portion where the tank portions of the core portion 100 are formed is not provided with the fin 14 and is a bypass area through which air is not passed or little passed not to smoothly exchange heat, the protruding sealing member 800 may be formed on a part of the lateral side surface of the housing 700. In addition, the sealing member 800 formed on the inner side surface of the housing 700 may extend from the upper end of the housing 700 to the bottom surface and the portion other than the opening through which air passes may be provided with the sealing member 800.

In addition, the sealing member 800 formed on the inner side surface of the housing 700 and the sealing member 800 formed on the bottom surface of the housing 700 may be connected to each other.

That is, the sealing member 800 may be formed to connect between both side surfaces and the lower side so that air is not bypassed between the housing 700 on both sides in the longitudinal direction and the core portion 100 and between the housing 700 on the lower side in the height direction and the core portion 100.

In addition, the sealing member 800 may be formed separately and attached to or joined to the inner side surface of the housing 700. That is, since the housing 700 can be generally made of metal or a plastic injection molding material so as to have sufficient structural rigidity, the sealing member 800 for sealing can be manufactured separately using a material having lower rigidity than the material of the housing 700, such that the sealing member 800 can be attached to or joined to the housing 700.

Third Exemplary Embodiment

Figure 14:
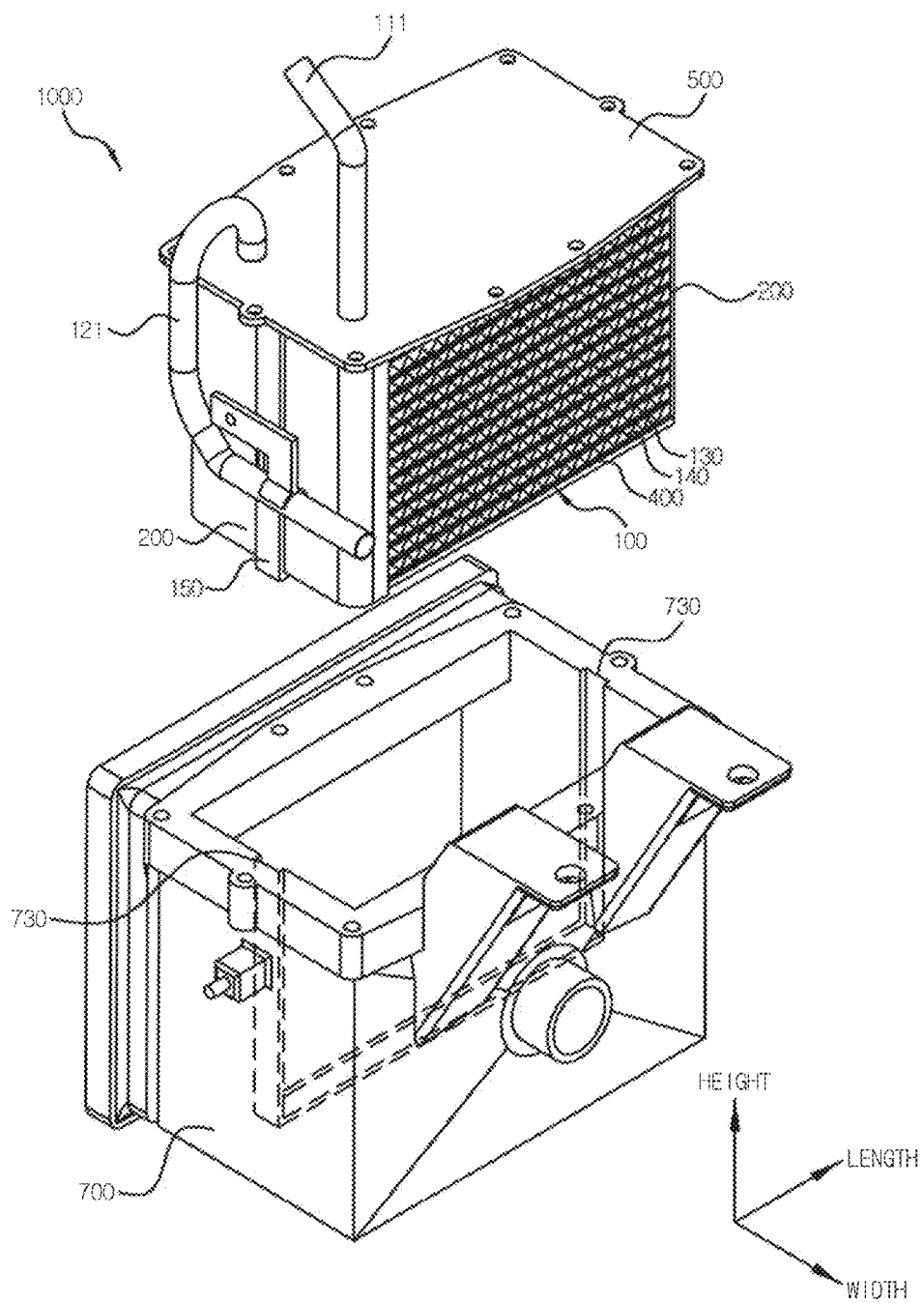
FIGS. 14 and 15 are an exploded perspective view illustrating a heat exchanger according to a third exemplary embodiment of the present invention and a top plan cross-sectional view schematically illustrating the heat exchanger.
Figure 15:
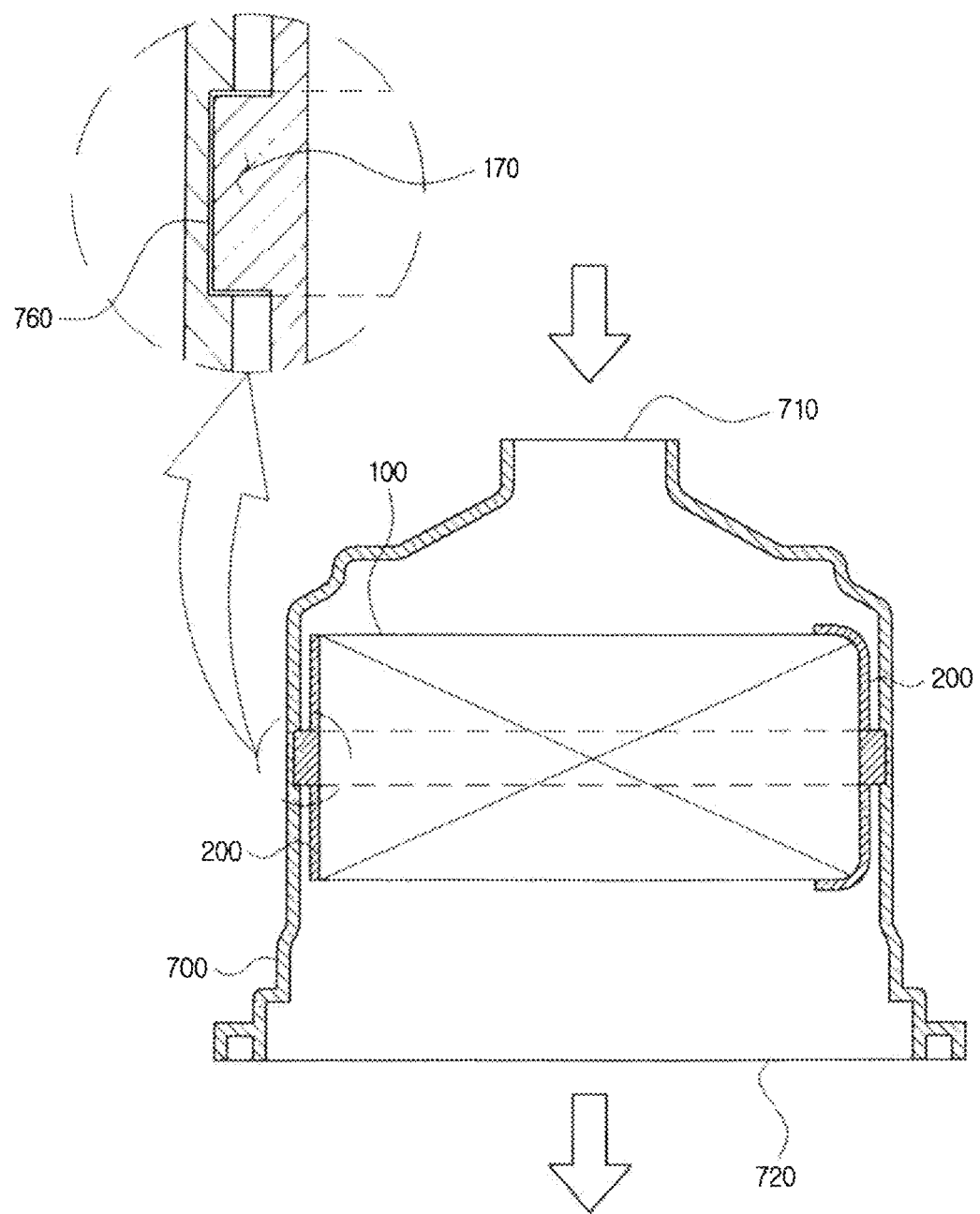

FIGS. 14 and 15 are an exploded perspective view illustrating a heat exchanger according to a third exemplary embodiment of the present invention and a top plan cross-sectional view schematically illustrating the heat exchanger.

As illustrated, a heat exchanger 1000 according to a second exemplary embodiment of the present invention includes: a core portion 100 configured to include an inlet tank portion and an outlet tank portion having a space in which cooling water is stored and flows, a plurality of tubes 130 having both ends connected to the tank portions to form a cooling water channel, and fins 140 interposed between the tubes 130; a housing 700 configured to have a concave shape to have the core portion 100 inserted thereinto so that the core portion 100 is housed therein and have one side provided with an air inlet 710 into which air is introduced and the other side provided with an air outlet 720 through which the air is discharged; and a sealing portion configured to seal between the core portion 100 and the housing 700, in which the sealing portion may include an insertion groove 760 concavely formed on the inner side surface and the bottom surface of the housing 700 and a protruding portion 170 protruding from the outer side surface and the lower surface of the core portion 100 to be inserted into the insertion groove 760.

First, like the above first exemplary embodiment, the core portion 100 and the housing 700 are formed and the sealing portion may include an insertion groove 760 concavely formed on the inner side surface of the housing 700 and the protruding portion 170 protruding from the outer side surface of the core portion 100 to be inserted into the insertion groove 760.

The protruding portion 170 of the core portion 100 is inserted into the insertion groove 760 of the housing 700 by using the ruggedness structure, such that the gap between insertion groove 760 and the protruding portion 170 may be very small in the state in which the protruding portion 170 is inserted into the insertion groove 760, thereby substantially preventing air from passing through the gap between the insertion groove 760 and the protruding portion 170. Like the second exemplary embodiment of the present invention, if the heat exchanger is operated to introduce hot air into the housing 700, the core portion 100 is thermally expanded to contact the housing 170 so that there is no gap between the insertion groove 760 and the protruding portion 170.

Thus, the inner side surface of the housing and the outer side surface of the core portion can be formed to be sufficiently separated from each other, so that the core portion can be easily assembled in the housing by being inserted thereinto. Further, when the core portion is assembled in the housing by being inserting thereinto, the insertion groove and the protruding portion serve as guides, thereby facilitating the assembly.

As illustrated, the insertion groove 760 may be formed on both inner side surfaces of the housing 700 in the longitudinal direction and may be formed even on the bottom surface to be connected to the insertion grooves on both side surfaces. The protruding portion 170 may be formed in various shapes and may be formed on the tubes 130 configuring the core portion 100 or on the side reinforcing plate 200 joined to the tubes 130. Further, the disposition and shape of the insertion groove and the protruding portion may be variously formed.

Further, the inlet pipe 111 connected to the inlet tank portion of the core portion 100 and the outlet pipe 121 connected to the outlet tank portion thereof are further provided, such that the inlet pipe 111 and the outlet pipe 121 may be joined to each other to penetrate through the upper reinforcing plate 500. That is, the inlet pipe 111 may be connected to the inlet tank portion of the core portion 100, and the outlet pipe 121 may be connected to the outlet tank portion of the core portion 100. At this time, the inlet pipe 111 and the outlet pipe 121 may be joined to each other to penetrate through a joining hole 510 formed to penetrate through the upper reinforcing plate 500, and the inlet pipe 111 and the outlet pipe 121 may be fixedly joined to the upper reinforcing plate 500 by brazing, welding or the like.

In addition, the area of the core portion 100 is formed to have a smaller area than that of an inside space of the housing 700 when viewed from above so that the core portion 100 can be easily inserted into a hollow space in the housing 700, such that the inner side surface of the housing 700 may be disposed to be spaced apart from the outer side surface of the core portion 100. Both outer side surfaces of the core portion 100 and both inner side surfaces of the housing 700 are formed to be spaced apart from each other in the longitudinal direction, such that the core portion 100 may be assembled in the housing 700 by being easily inserted into the housing 700 downwardly from above through the opened upper side of the housing 700.

In addition, the sealing member 800 may also be made of an elastic material.

That is, since the sealing member 800 is made of the elastic material, the sealing member can serve to absorb vibrations while preventing air from being bypassed between the core portion 100 and the housing 700. Further, the sealing member 800 of the elastic material can absorb dimensional tolerances and assembly tolerances.

In addition, contrary to the above description, the sealing member 800 may be formed in the shape in which the sealing member 800 protrudes from the core portion 100. In addition, the groove is concavely formed on the upper surface of the housing 700 and is applied or interposed with a separate sealing member, and then the upper reinforcing plate 500 joined to the upper side of the core portion 100 adheres to the upper surface of the housing 700, such that the space between the lower surface of the upper reinforcing plate 500 and the upper surface of the housing 700 can be sealed.

Further, the sealing member 800 may be formed not to block both lateral side surfaces of the core portion 100 so that air can pass between the tubes 130, and may be formed to block the remaining area other than the area in which the fin 140 of the core portion 100 in the both lateral side surfaces of the core portion 100.

The heat exchanger according to the exemplary embodiment of the present invention includes the sealing member to prevent the air from being bypassed through the space between the core portion and the housing, thereby improving the heat exchange performance.

In addition, the sealing member can be easily joined to the housing without the separate adhesive or rib for reinforcement, and the sealing member can serve as the guide when the core portion is assembled in the housing, thereby facilitating the assembly of the core portion.

Further, the sealing member can adhere to the core while being bent by the air pressure, thereby certainly preventing the air from being bypassed.

The present invention is not limited to the above-mentioned embodiments but may be variously applied, and may be variously modified by those skilled in the art to which the present invention pertains without departing from the gist of the present invention claimed in the claims.

What is claimed is:

1. A heat exchanger, comprising:
a core portion configured to include an inlet tank portion and an outlet tank portion having a space in which cooling water is stored and flows, a plurality of tubes having both ends connected to the tank portions to form a cooling water channel, and fins interposed between the tubes;
a housing configured to have a concave shape to have the core portion inserted thereinto so that the core portion is housed therein and have one side provided with an air inlet into which air is introduced and the other side provided with an air outlet through which the air is discharged; and an elastic sealing member configured to be interposed between an outer side of the core portion and an inner side of the housing to seal between the core portion and the housing, wherein both longitudinal inner side surfaces and a bottom surface of the housing are concavely provided with a joining groove to insert one side of the sealing member into the joining groove, wherein both longitudinal outer side surfaces and a bottom surface of the core portion are concavely provided with a fitting groove to insert the other side of the sealing member into the fitting groove, the fitting groove being wider than the sealing member so as to be spaced apart from the sealing member, wherein the other side of the sealing member protruding inwardly from the longitudinal side surfaces of the housing has a length larger than a width, in a state in which one side of the sealing member is inserted and joined into the joining groove of the housing, and wherein the other side of the sealing member is inserted in such a manner as to be spaced apart from inner side surfaces of the fitting groove, and is configured such that when the air is introduced into the housing, the other side of the sealing member is bent by a pressure of the introduced air and a lateral side surface of the sealing member opposite to an air-introduced direction adheres to one of the lateral side surfaces of the fitting groove opposite to the air-introduced direction.

2. The heat exchanger of claim 1, wherein the inner side of the housing and the outer side of the core portion are spaced apart from each other.

3. The heat exchanger of claim 1, wherein a longitudinal side surface of the other side of the sealing member is formed to have a narrower width than the one side of the sealing member.

4. The heat exchanger of claim 1, wherein the housing is concavely provided with a fixed groove so that the fixed groove is connected to the joining groove, and one side of the sealing member inserted into the joining groove of the housing is protrudedly provided with a fixed protrusion to insert the fixed protrusion into the fixed groove; wherein the fixed protrusion protrudes from one side or both sides in a width direction, and wherein the fixed protrusion is inserted into the fixed groove such that the sealing member firmly fixed to the housing, and wherein the movement of the sealing member is limited to be prevented from moving in the height direction and the longitudinal direction.

5. The heat exchanger of claim 1, wherein the other side of the sealing member is disposed to be spaced apart from the fitting groove of the core portion.

6. The heat exchanger of claim 1, wherein the bottom surface of the core portion is provided with a support portion protruding downwardly, wherein the support portion is inserted into a sealing groove formed in the bottom surface of the housing.

* * * * *